(12) United States Patent
Tsuji

(10) Patent No.: US 6,885,290 B2
(45) Date of Patent: Apr. 26, 2005

(54) ANTITHEFT DEVICE FOR VEHICLES

(75) Inventor: Mitsuru Tsuji, Shuuchj-gun (JP)

(73) Assignee: Kabushiki Kaisha Morie, Mori-machi (JP)

( * ) Notice: Subject to any disclaimer, the term of this patent is extended or adjusted under 35 U.S.C. 154(b) by 88 days.

(21) Appl. No.: 10/065,406

(22) Filed: Oct. 15, 2002

(65) Prior Publication Data

US 2003/0080859 A1 May 1, 2003

(30) Foreign Application Priority Data

Oct. 30, 2001 (JP) ........................................ 2001-333368

(51) Int. Cl.⁷ ............................................... B60R 25/10
(52) U.S. Cl. ............... 340/427; 340/426.1; 340/426.11; 340/5.31; 340/5.6
(58) Field of Search ........................... 340/426, 426.11, 340/426.1, 5.31, 5.6, 432, 427; 307/10.3, 10.4, 10.5, 10.6; 180/277, 279, 283, 285

(56) References Cited

U.S. PATENT DOCUMENTS

| | | | |
|---|---|---|---|
| 5,343,077 A | | 8/1994 | Yoshida et al. |
| 5,838,227 A | * | 11/1998 | Murray ........................ 340/426 |
| 5,889,472 A | * | 3/1999 | Nagel et al. ................. 340/426 |
| 5,982,295 A | * | 11/1999 | Goto et al. .................. 307/10.1 |
| 6,104,309 A | * | 8/2000 | Ozawa ......................... 340/568 |
| 6,144,294 A | * | 11/2000 | Watanabe ............... 340/426.35 |
| 6,400,042 B1 | * | 6/2002 | Winnwer, Jr. et al. ...... 340/426 |

FOREIGN PATENT DOCUMENTS

| | | |
|---|---|---|
| DE | 19622377 A | 12/1997 |
| EP | 0596762 A | 5/1994 |
| EP | 0794095 A | 9/1997 |
| EP | 0893315 A | 1/1999 |
| FR | 2752549 A | 2/1998 |
| FR | 2789632 A | 8/2000 |
| WO | WO0134439 A | 5/2001 |

OTHER PUBLICATIONS

French Search Report dated Jan. 9, 2004.

* cited by examiner

*Primary Examiner*—Hung Nguyen
(74) *Attorney, Agent, or Firm*—Ernest A. Beutler

(57) ABSTRACT

Two embodiments of very simple by highly effective antitheft devices for use in small vehicles such as motor scooters, personal watercraft or other forms of watercraft. Each system employs a removable component which also functions as a display and which disables the operation of the prime mover of the vehicle. The removed component can be carried by the user and reinserted when he desires to again operate the vehicle.

23 Claims, 5 Drawing Sheets

ANTITHEFT DEVICE FOR VEHICLES

BACKGROUND OF INVENTION

This invention relates to an antitheft device for vehicles and more particularly to an improved and simplified antitheft device particularly useable with small vehicles that are more prone to unauthorized use.

Automobiles are provided with very complex security systems so as to insure against unauthorized use by undesired persons. However, a wide variety of other types of vehicles such as motorcycles, motor scooters, personal watercraft and other forms of watercraft do not have nor can they accommodate such complicated sophisticated antitheft systems. Therefore, it has been mainly the practice to equip these vehicles with key operated locks which are intended to prevent unauthorized use. However, because of the very nature of these vehicles, it is very easy to disable the locking mechanism and commit theft.

It is, therefore, a principal object to this invention to provide an improved and simplified system for preventing unauthorized use of these smaller type vehicles.

It is a further object to this invention to provide an improved and simplified antitheft system for such vehicles which can be easily carried by the user to protect the vehicle from unauthorized use.

SUMMARY OF INVENTION

This invention is adapted to be embodied in a vehicle and antitheft system therefore. The vehicle has a body defining a rider's area for accommodating at least one rider. A propulsion device is carried by the body for propelling the vehicle along a terrain. A prime mover for driving the propulsion device is carried by the body. A control system for operating the prime mover is also carried by the body. A main switch carried by the body enables the operation of the prime mover. A vehicle antitheft device is provided in the connection between the main switch and the control system. The vehicle antitheft device is removably supported on the body so that a rider may disable the operation of the prime mover by removing the antitheft device from the vehicle body.

DETAILED DESCRIPTION

Figure 1:
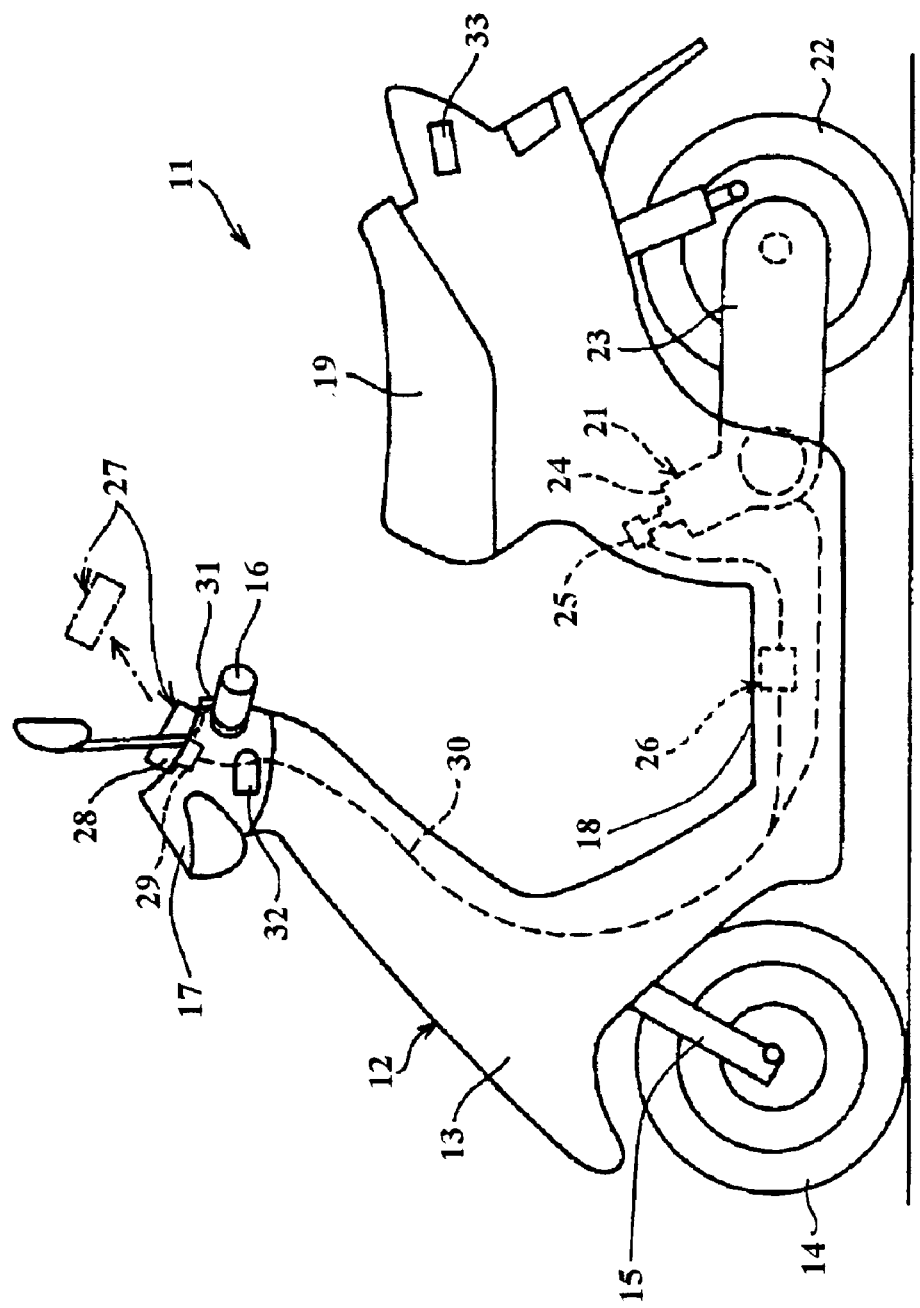
FIG. 1 is a side elevational view of a vehicle equipped with an antitheft system constructed in accordance with a first embodiment of the invention and showing how the antitheft system can be removed from the vehicle in phantom line view.

Referring now in details to the drawings and initially to FIG. 1, a small type of vehicle of the type which can benefit from the use of the invention is identified generally by the reference numeral 11. In the illustrated embodiment, the vehicle 11 is a motor scooter but, from the foregoing description, it should be readily apparent to those skilled in the art that the invention can be equally as well used with other types of small vehicles such as motorcycles, personal watercraft and other watercraft that are especially prone to unauthorized use.

The motor scooter 11 is provided with a main body assembly 12 which includes an outer body member 13 which can be supported on any suitable type of frame. This frame journals a front wheel 14 on a fork assembly 15 that is dirigibly supported by the vehicle body 12 and which is steered by a handle bar assembly 16 positioned at its upper end. The upper portion of the handle bar assembly 16 may be enclosed preferably by a handle bar cover 17 of any suitable configuration.

The body 13 has a floor board 18 on which a rider seated on a seat 19 at the rear of the motor scooter may place his feet. The rider obviously steers the vehicle 11 by the handle bar assembly 16.

Positioned beneath the seat 19 in the body assembly 12 and concealed by the main body member 13, is a prime mover in the form of a single cylinder, spark ignited, internal combustion engine. This engine is indicated generally by the reference numeral 21. Although this particular type of prime mover is described as being exemplary, it will be readily apparent to those skilled in the art how the invention can be utilized with other types of prime movers that may be utilized with these types of vehicles.

The engine 12 is supported in the frame assembly and drives a rear wheel 22 through a transmission 23 of a suitable type. The manner of suspending the engine 21 and driving the rear wheel 22 may of any type known in this art.

The engine 21 includes a cylinder block cylinder head assembly 24 in which an ignition plug 25 is provided for firing a charge which is delivered to the combustion chamber of the engine by a suitable system for engine operation. Again, those skilled in the art will readily understand how the invention can be utilized with various types of engine controls. Since the details of the engine 21 other than its control form no part of the invention, further description is unnecessary to permit those skilled in the art to practice the invention.

Mounted on the body assembly 12 and concealed within the outer body member 13 is an engine ignition control, indicated generally by the reference numeral 26, and which has a construction will be described shortly by reference to FIG. 3. This engine control system 26 is provided in a circuit, shown schematically at 30, with the ignition plug 25 certain sensors, as will be described shortly, and an antitheft device that includes a vehicle display, indicated generally by the reference numeral 27. This antitheft device 27 is, in accordance with the invention, mounted detachably within a receptor box 28 carried by the handle bar cover 17. This connection is established through a quick disconnect connector, indicated by the reference numeral 29 and which makes a number of connections as will described shortly.

Mounted on the handle bar cover 17 in proximity to the antitheft device 27 is a main switch 31 which is operated by a key in a manner well known in the art.

The vehicle 11 is also provided with turn signal flashers 32 and 33 at the front and rear of the vehicle 11 and on opposite sides thereof. These are operated by a rider controlled switch, as is well known in the art. Except for the detachability of the antitheft device 27, which includes a meter, to be described, the construction as thus far described many be considered to be conventional.

Figure 2:
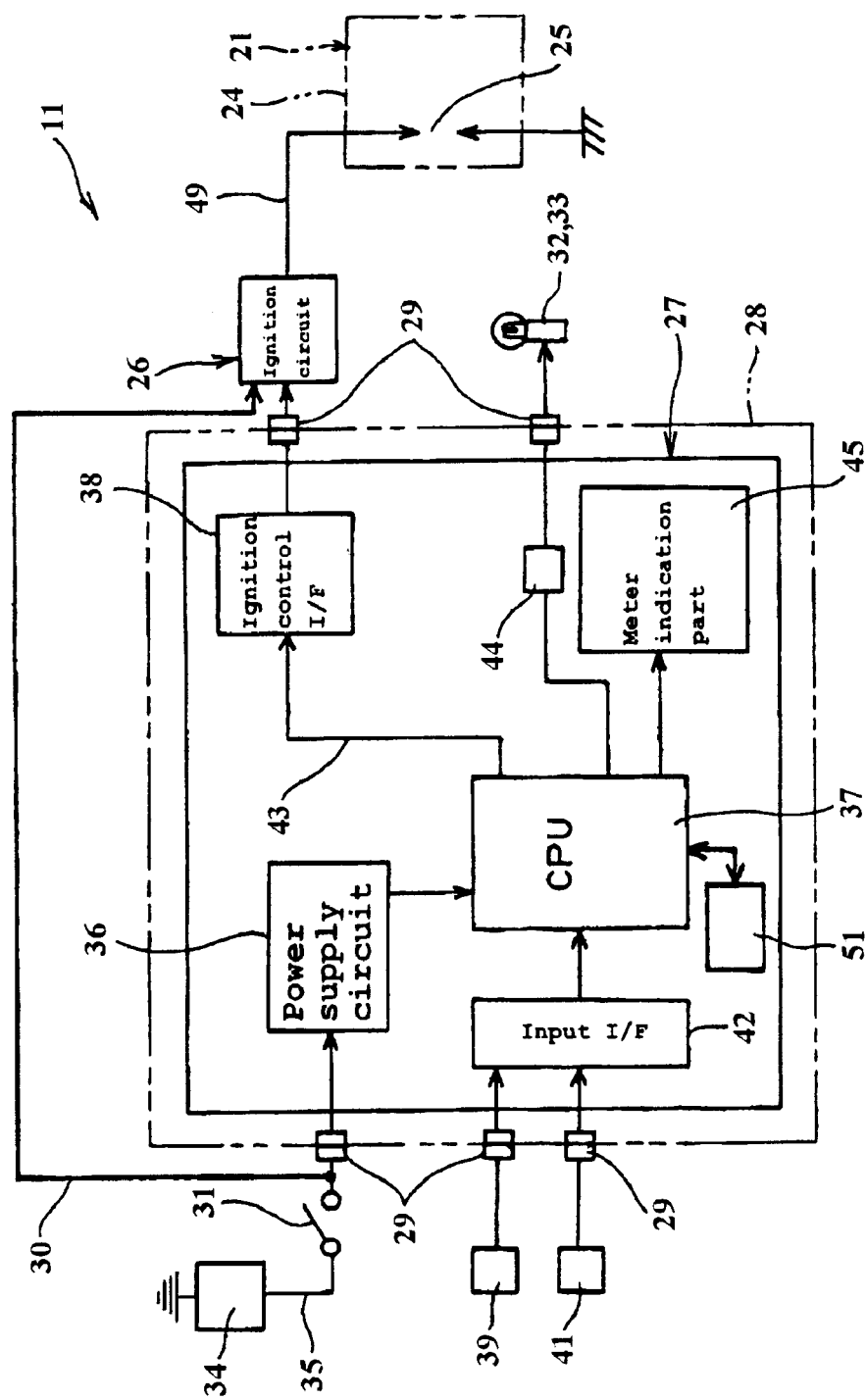
FIG. 2 is a partially schematic view showing how the antitheft device is associated with the vehicle body.

Referring now primarily to FIG. 2, the antitheft device 27 will be described in more detail by reference to this schematic view. Shown in this view is the electrical power source for the vehicle 11 namely a battery 34 which is mounted in a suitable manner. The battery is also grounded in a suitable manner to the vehicle frame and which has a power connection 35 that goes directly to the main switch 31.

When switched on the main switch 31, electrical power is delivered from the battery 34 to the ignition circuit 26 through a line indicated at 30 which is included in the corresponding power line 30 in FIG. 1. In addition, one of the quick connectors 29 connects the main switch 31 to a power supply circuit 36 which is positioned within the antitheft device 27.

This power supply circuit 36 controls the supply of power to a CPU 37 which processes other signals and delivers them to an ignition control interface 38 which connects to the ignition circuit 26 through another quick disconnect connector 29.

Various sensors and switches are provided for controlling not only the operation of the engine 21 but also to display certain information to the rider of the vehicle 11. Such sensors are indicated at 39 and 41 in FIG. 2 and these may be sensors of such things as the crank angle of the engine for engine timing, and a sensor 41 for sensing vehicle speed. Also the switching of the flasher lights 32 and 33 is controlled through the CPU 37.

These signals are transmitted through suitable conductors including quick disconnect connections 29 through an input interface, indicated at 42, which processes the signals and sends them to the CPU 37. Having processed this information, the CPU 37 outputs control signals including a control signal through a conductor 43 to the ignition control for controlling the firing of the spark plug 25. In addition, the CPU 37 outputs data to things such as the flasher lights 32, 33 through a flasher control 44. As noted, a suitable directional signal switch (not shown) provides an additional input to the CPU 37 through the interface 42.

In addition and as already noted, the antitheft device 27 includes a meter display 45 that will displays visual information to the rider of the vehicle. This can include vehicle speed as determined from the information from the sensor 41 and also the operation of the flashers 32 and 33. Additional information may also be displayed.

Figure 3:
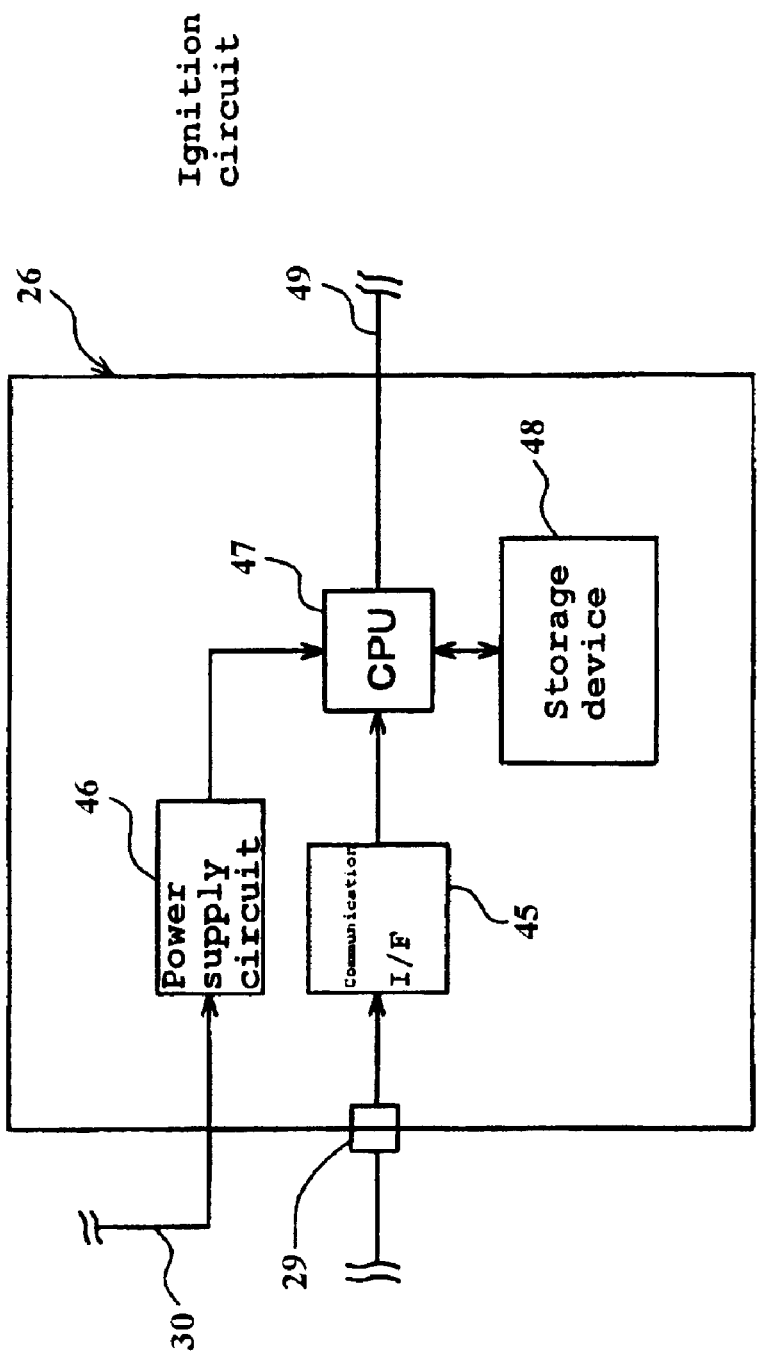
FIG. 3 is a schematic view, in part similar to FIG. 2, but shows the details of the ignition circuit.

Referring now additionally to FIG. 3, the connection to the ignition circuit 26 and the details of the ignition circuit 26 will be described in more detail. The ignition circuit 26 includes a communication interface 45 that receives the ignition control signal from CPU 37 through the ignition control interface 38. In addition a power supply circuit 46 receives power directly from the battery line 30. Both the ignition control interface 38 and the power supply circuit 46 transmit their signals and power to a CPU 47. There is also provided an electrical storage unit 48 in the ignition circuit 26 for a purpose to be described.

The output from the CPU 47 is transmitted through a conductor 49 to a spark coil for firing the spark plug 25 at the desired timing for the detected running conditions. Any desired type of control strategy can be employed for this purpose.

From the foregoing description, it should be apparent that there are a number of disconnectable connections between various components and the antitheft control unit 27. These connections are shown separately in FIGS. 2 and 3 for simplicity. In actual practice, they will be bundled together in wire harnesses with only one or two connectors at their ends.

In addition to these electrical connections that can be ready disconnected, some form of mechanical interlock can be provided between the antitheft device 27 including the meter 45 and its mounting housing 28 so as to facilitate removal of the antitheft device 27 when the operator leaves the vehicle unattended. Thus, it should be readily apparent that when the operator removes the antitheft unit 27 from the vehicle 11, it cannot be operated. In addition to preventing operation of the engine 21, operation of such things as the gauges and flashers is also disabled.

For further protection against unauthorized use, an EPROM memory unit in the form of another storage device, indicated by the reference numeral 51 is provided in the antitheft device 27. This communicates with the device 48 of the ignition circuit and each is coded so as to recognize an appropriate or registered relationship so that someone with a meter and antitheft device from another vehicle can not operate a vehicle other than that vehicle it was intended for. That is, the storage devices 48 and 51 must provide cooperating and recognized signals with each other before permitting operation of the CPUs 37 and 47. This provides additional assurance against unauthorized se.

Figure 4:
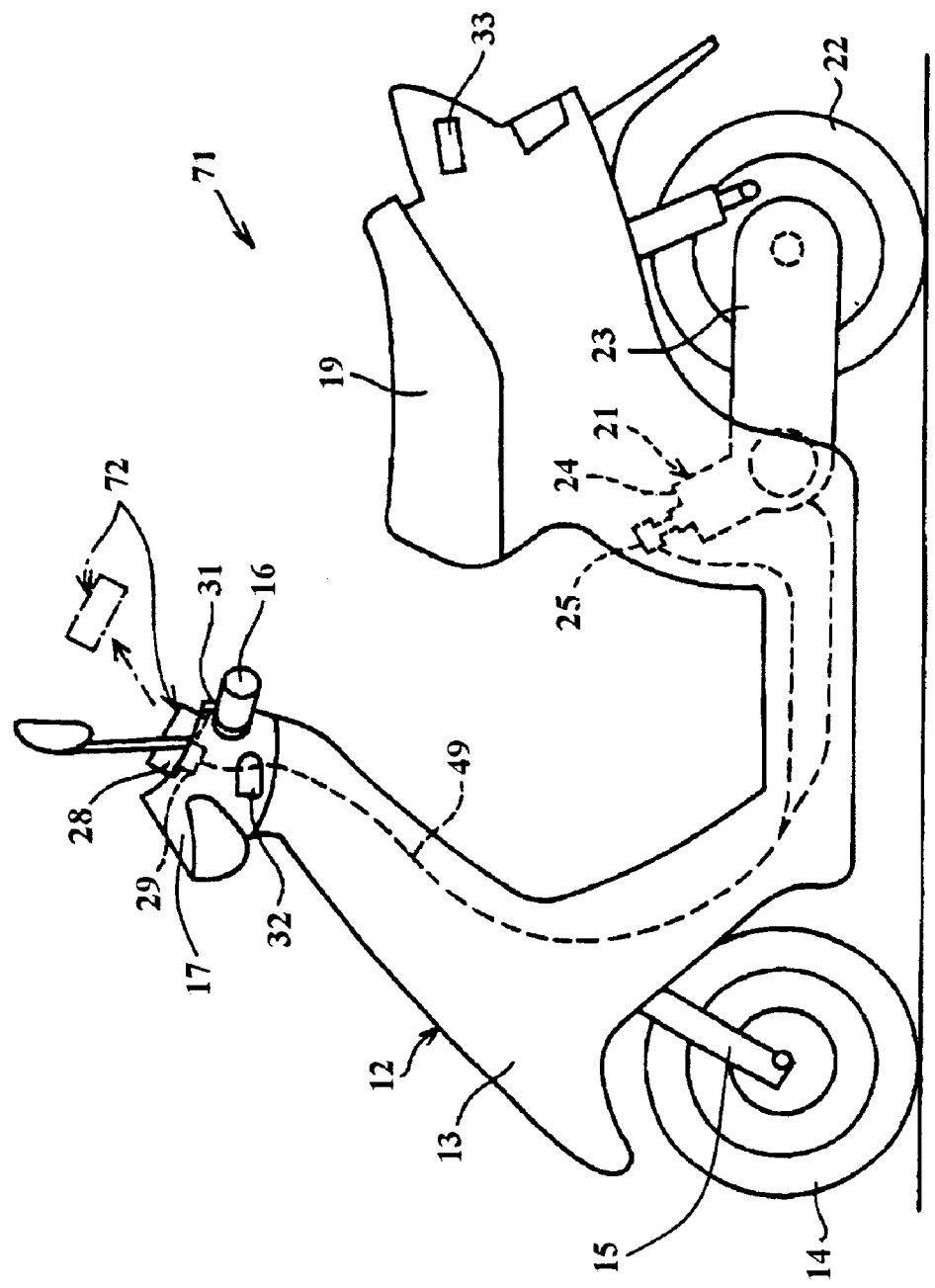
FIG. 4 is a side elevational view, in part similar to FIG. 1, and shows a second embodiment of the invention.
Figure 5:
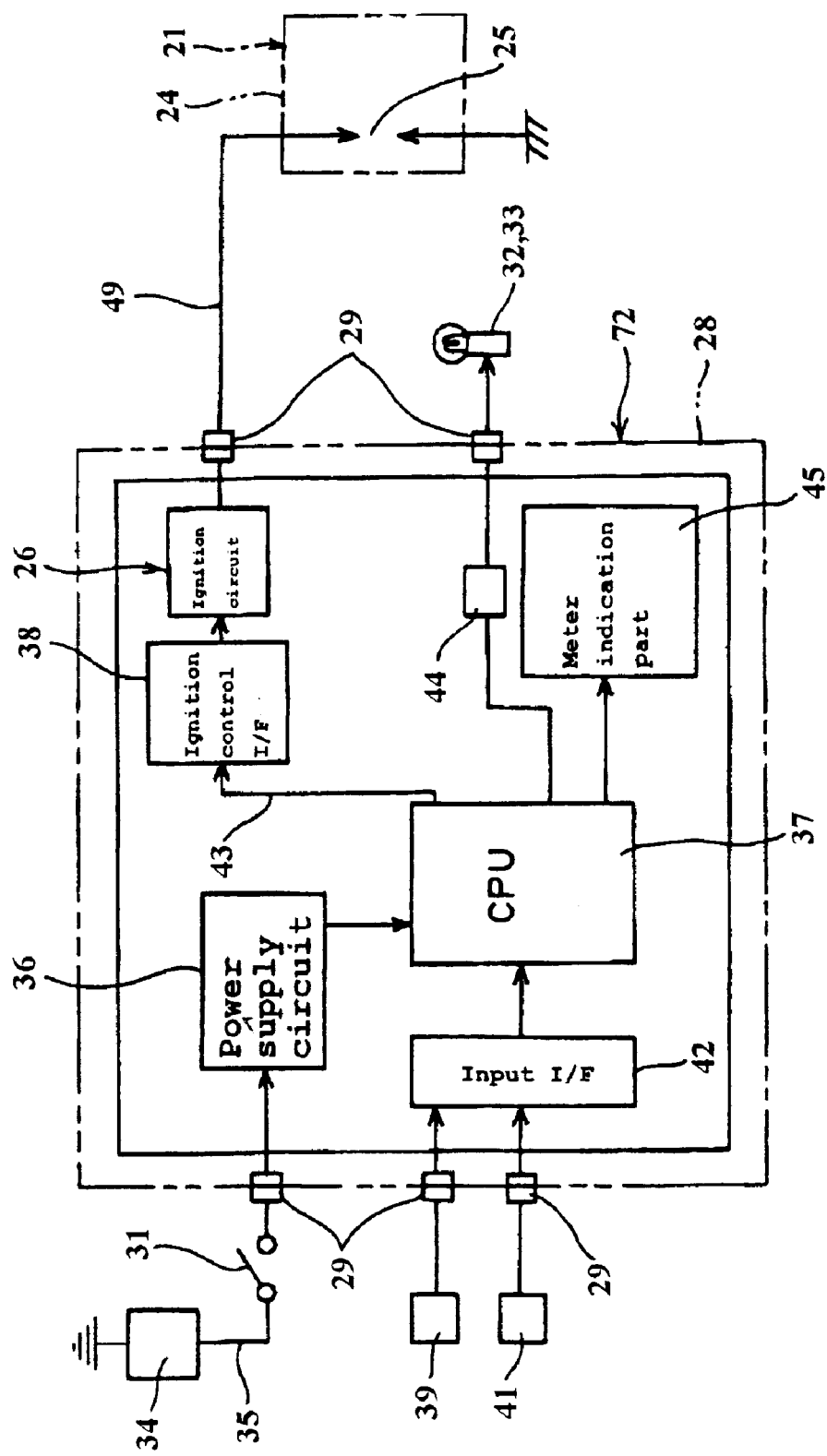
FIG. 5 is a schematic diagram, in part similar to FIG. 2, but shows the details of this second embodiment of the invention.

Referring now in detail to the embodiment of FIGS. 4 and 5, a vehicle constructed in accordance with this embodiment is identified generally by the reference numeral 71. In many regards, the vehicle 71 is the same or substantially the same as that embodiment as thus far described. Where that is the case, components which are the same or substantially the same have been identified by the same reference numerals and will be described again only in so far as is necessary to permit those skilled in the art to practice this embodiment of the invention.

In this embodiment, the antitheft device, indicated generally by the reference numeral 72, incorporates the ignition circuit 26 in addition to the components previously described. Thus, the overall external wiring is substantially simplified as may be seen by comparing FIGS. 2 and 3 with FIG. 5.

When the antitheft device 72 is completely removed from the vehicle 71, it is impossible to operate the engine 21 because there is no ignition circuit for firing the spark plug 25. Also, all of the auxiliaries will be inoperative because of the removal of the circuits going to them, as aforenoted.

Thus, from the foregoing description it should be readily apparent that the described embodiments of the invention provide a very effective antitheft device for small vehicles which permits the operator to insure that the vehicle cannot be operated by unauthorized persons. Of course, the foregoing description is that of preferred embodiments of the invention and various changes and modifications can be made without departing from the spirit and scope of the invention, as defined by the appended claims.

What is claimed is:

1. A vehicle and antitheft device therefore, said vehicle having a body defining a riders area for accommodating at least one rider, a propulsion device carried by said body for propelling said vehicle along a terrain, a prime mover driving said propulsion device carried by said body, a control system for operating said prime mover carried by said body, a main switch carried by said body for enabling the operation of said prime mover, and a vehicle antitheft device in the connection between said main switch and said control system, said vehicle antitheft device being removably supported on said body so that a rider may disable the operation of said prime mover by removing said antitheft device from said vehicle body and thus disconnecting the connection between said main switch and said control system.

2. A vehicle and antitheft device therefore as set forth in claim 1, wherein the control system is electrically powered from a battery carried in the vehicle body and the vehicle antitheft device is interposed in the connection of the battery to the control system.

3. A vehicle and antitheft device therefore as set forth in claim 1, wherein the main switch is operated by a form of antitheft device other than the vehicle antitheft device.

4. A vehicle and antitheft device therefore as set forth in claim 3, wherein the control system is electrically powered from a battery carried in the vehicle body and the vehicle antitheft device is interposed in the connection of the battery to the control system.

5. A vehicle and antitheft device therefore as set forth in claim 1, wherein the vehicle antitheft device performs another function in addition to antitheft.

6. A vehicle and antitheft device therefore as set forth in claim 5, wherein the other function of the vehicle antitheft device is the display of a vehicle condition to the rider.

7. A vehicle and antitheft device therefore as set forth in claim 6, wherein the control system receives information of at least one vehicle condition for its operation from a sensor on the vehicle body.

8. A vehicle and antitheft device therefore as set forth in claim 7, wherein the connection between the sensor and the control system passes through the vehicle antitheft device and is broken when the vehicle antitheft device is removed from the vehicle body.

9. A vehicle and antitheft device therefore as set forth in claim 8, wherein the vehicle condition displayed by the vehicle antitheft device is information received from a second sensor.

10. A vehicle and antitheft device therefore as set forth in claim 9, wherein the main switch is operated by a form of antitheft device other than the vehicle antitheft device.

11. A vehicle and antitheft device therefore as set forth in claim 10, wherein the control system is electrically powered from a battery carried in the vehicle body and the vehicle antitheft device is interposed in the connection of the battery to the control system.

12. A vehicle and antitheft device therefore as set forth in claim 1, wherein the prime mover comprises a spark ignited internal combustion engine and the control system controls the spark ignition thereof.

13. A vehicle and antitheft device therefore as set forth in claim 12, wherein the main switch is operated by a form of antitheft device other than the vehicle antitheft device.

14. A vehicle and antitheft device therefore as set forth in claim 13, wherein the control system is electrically powered from a battery carried in the vehicle body and the vehicle antitheft device is interposed in the connection of the battery to the control system.

15. A vehicle and antitheft device therefore as set forth in claim 14, wherein the vehicle antitheft device performs another function in addition to antitheft.

16. A vehicle and antitheft device therefore as set forth in claim 15, wherein the other function of the vehicle antitheft device is the display of a vehicle condition to the rider.

17. A vehicle and antitheft device therefore as set forth in claim 16, wherein the control system receives information of at least one vehicle condition for its operation from a sensor on the vehicle body.

18. A vehicle and antitheft device therefore as set forth in claim 17, wherein the connection between the sensor and the control system passes through the vehicle antitheft device and is broken when the vehicle antitheft device is removed from the vehicle body.

19. A vehicle and antitheft device therefore as set forth in claim 18, wherein the vehicle condition displayed by the vehicle antitheft device is information received from a second sensor.

20. A vehicle and antitheft device therefore as set forth in claim 19, wherein the main switch is operated by a form of antitheft device other than the vehicle antitheft device.

21. A vehicle and antitheft device therefore as set forth in claim 14, wherein the vehicle antitheft device has a preset code and the vehicle body has a sensor that permits operation of the control system only if the preset code is recognized by the vehicle body sensor.

22. A vehicle and antitheft device therefore as set forth in claim 1 wherein the vehicle antitheft device includes a CPU for controlling an engine control system of the vehicle.

23. A vehicle and antitheft device therefore as set forth in claim 22 wherein the CPU for controls an ignition system for an engine of the vehicle.

* * * * *